United States Patent [19]

Seki et al.

[11] Patent Number: 4,825,377
[45] Date of Patent: Apr. 25, 1989

[54] COMPLEX CURVED SURFACE CREATION METHOD

[75] Inventors: Masaki Seki; Norihisa Amano, both of Tokyo, Japan

[73] Assignee: Fanuc Ltd, Minamitsuru, Japan

[21] Appl. No.: 928,288

[22] PCT Filed: Feb. 28, 1986

[86] PCT No.: PCT/JP86/00100

§ 371 Date: Oct. 23, 1986

§ 102(e) Date: Oct. 23, 1986

[87] PCT Pub. No.: WO86/05289

PCT Pub. Date: Sep. 12, 1986

[30] Foreign Application Priority Data

Feb. 28, 1985 [JP] Japan ................................ 60-39445

[51] Int. Cl.⁴ ........................................... G05B 19/403
[52] U.S. Cl. .................................. 364/474.29; 318/570
[58] Field of Search ............... 364/168, 167, 169, 191, 364/520, 170, 171; 318/570

[56] References Cited

U.S. PATENT DOCUMENTS

| | | | |
|---|---|---|---|
| 3,882,304 | 5/1975 | Walters | 364/169 |
| 4,491,906 | 1/1985 | Kishi et al. | 364/167 X |
| 4,506,331 | 3/1985 | Kishi et al. | 364/169 X |
| 4,506,336 | 3/1985 | Hird | 364/520 |
| 4,519,026 | 5/1985 | Nozawa et al. | 364/167 |
| 4,523,270 | 6/1985 | Kishi et al. | 364/171 X |
| 4,546,427 | 10/1985 | Kishi et al. | 364/168 O |
| 4,569,014 | 2/1986 | Kishi et al. | 364/167 X |
| 4,589,062 | 5/1986 | Kishi et al. | 364/168 |
| 4,617,623 | 10/1986 | Inoue et al. | 364/167 |
| 4,618,924 | 10/1986 | Hinds | 364/191 |

Primary Examiner—Allen MacDonald
Attorney, Agent, or Firm—Staas & Halsey

[57] ABSTRACT

This invention relates to a complex curved surface creation method for creating a complex curved surface (201) composed of at least two three-dimensional curved surfaces (201a, 201b, 201c). The complex curve surface creation method comprises a first step of inputting data for specifying each of the three-dimensional curved surfaces (201a–201c) and inputting data specifying one line of intersection (CLi) on a predetermined plane e.g. an X-Y plane (203) as well as a rule for specifying a number of lines of intersection on the predetermined plane on the basis of the line of intersection, a second step of finding a section curve (SCi) of the complex curved surface (201) based on a section (202) which has an i-th line of intersection, among the number of lines of intersection, as its line of intersection with the predetermined plane (203), and a third step of specifying the complex curved surface (201) by assembling the section curves (SCi; i=1, 2, 3, ...) based on sections corresponding to respective ones of the lines of intersection.

6 Claims, 6 Drawing Sheets

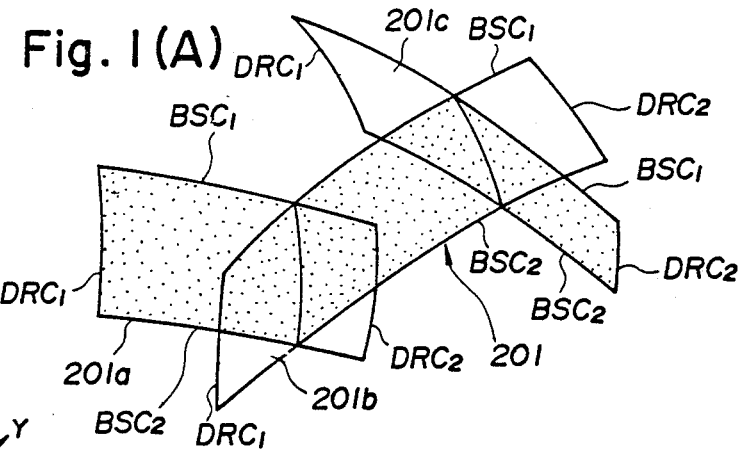
Fig. I(A)
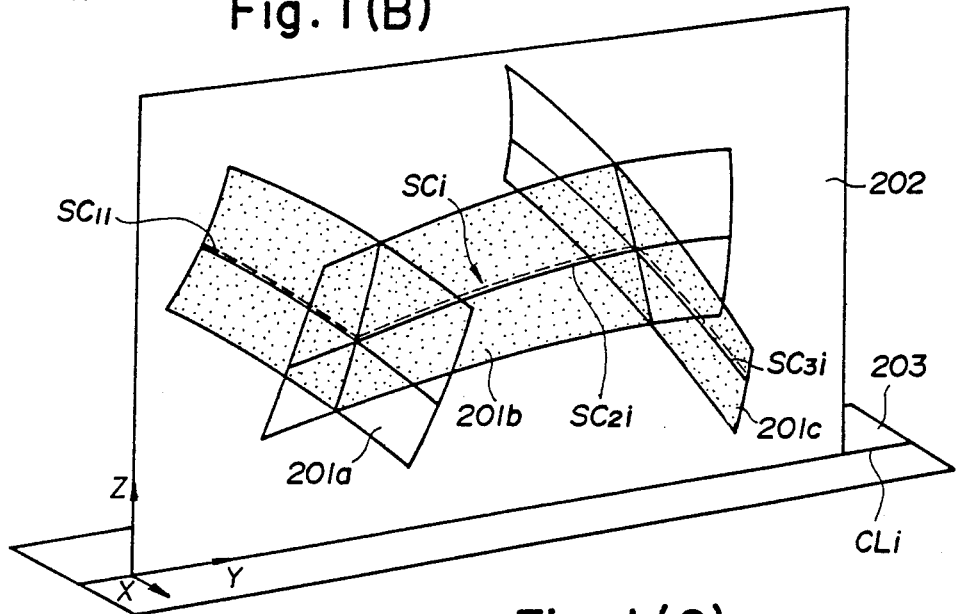
Fig. I(B)
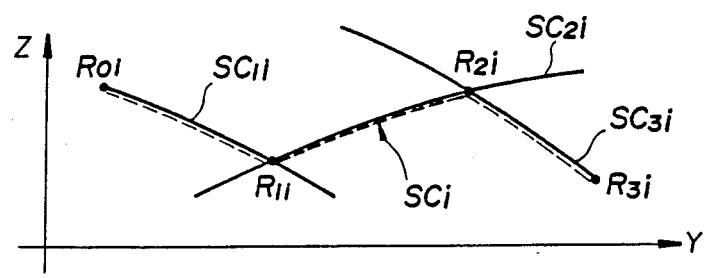
Fig. I(C)

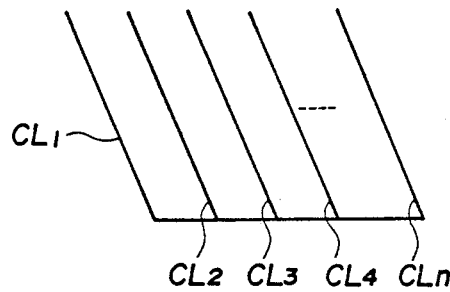
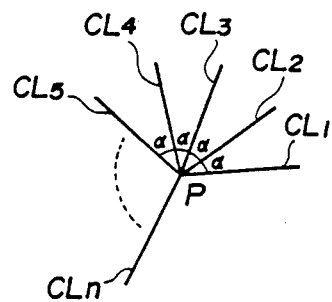
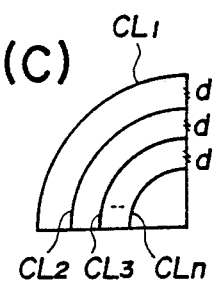
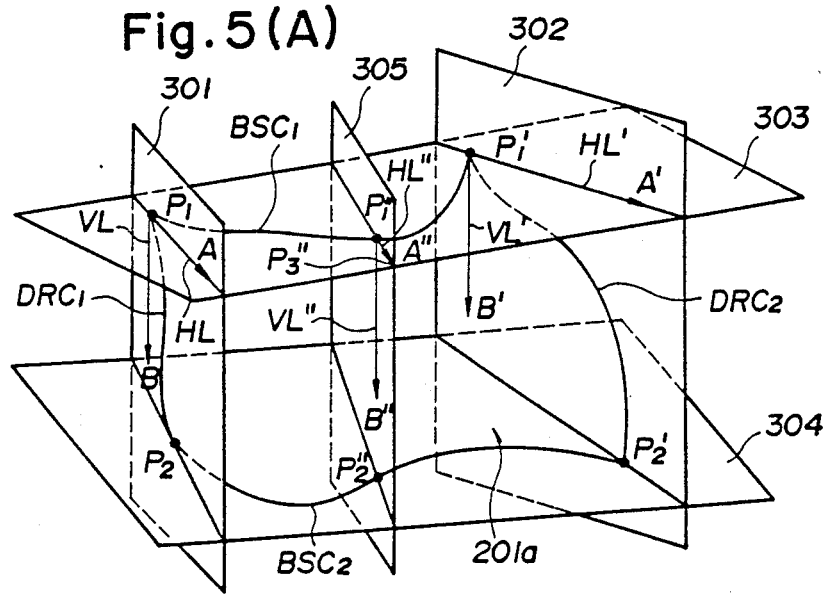

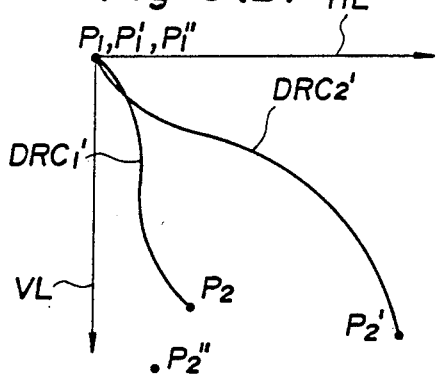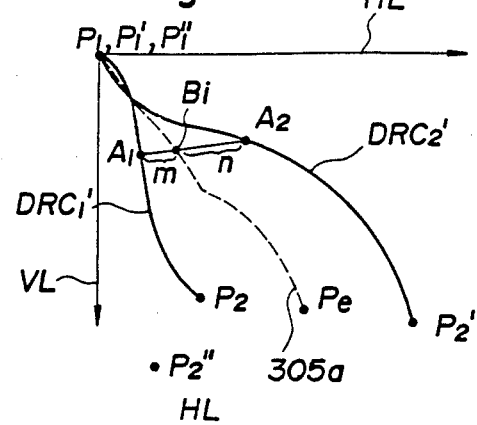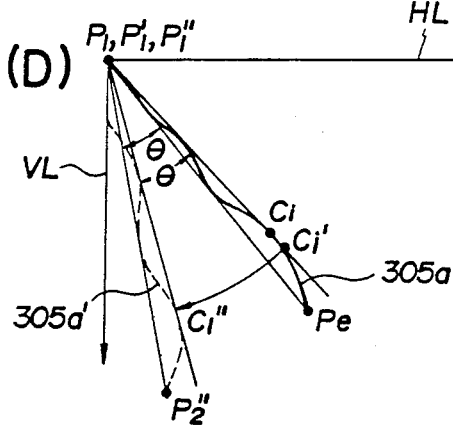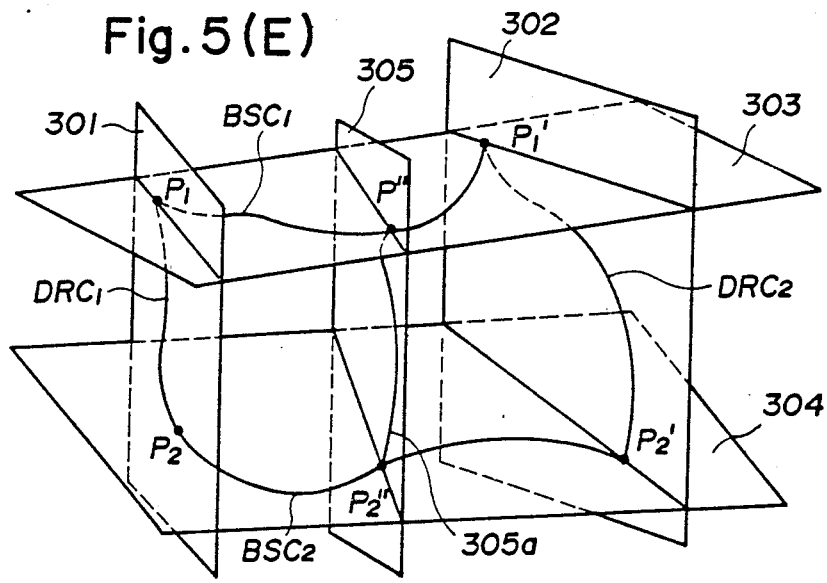

COMPLEX CURVED SURFACE CREATION METHOD

BACKGROUND OF THE INVENTION

1. Field of the Invention

This invention relates to a method of generating a complex curved surface and, more particularly, to a method of generating a complex curved surface by combining at least two three-dimensional curved surfaces.

2. Description of the Related Art

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, there has been developed and put into practical use a method comprising generating a plurality of intermediate sections in accordance with predetermined rules from several sections of a three-dimensional curved body and from data specifying section curves, finding a section curve (intermediate section curve) on the curved body based o the intermediate sections, and generating a curved surface of the three-dimensional body based on the plurality of generated intermediate section curves. For example, see the specification of Japanese Patent Application Laid-Open No. 57-5109 (corresponding to U.S. Pat. No. 4,491,906), and "Introduction to NC Programming", published by Nikkan Kogyo Shimbunsha, Oct. 30, 1981, pp. 156-162. This method is useful in generating a smooth curved surface from section data.

Depending upon machining, there are cases where it is necessary to machine a complex curved surface obtained by combining two or more three-dimensional curved surfaces, or in other words, to create a complex curved surface. However, it is not possible with the prior art to create a complex curved surface in a simple manner by combining these three-dimensional curved surfaces using the data indicative of each three-dimensional curved surface.

SUMMARY OF THE INVENTION

Accordingly, an object of the present invention is to provide a novel method of creating a complex curved surface through which a complex curved surface composed of curved surfaces can be created using the curved surface data of each curved surface.

The present invention provides a complex curved surface creation method for creating a complex curved surface composed of at least two three-dimensional curved surfaces. The complex curve surface creation method comprises (1) a first step of inputting data for specifying each of the three-dimensional curved surfaces and inputting data specifying one line of intersection on a predetermined plane as well as a rule for specifying a number of lines of intersection on the predetermined plane on the basis of said line of intersection, (2) a second step of finding a section curve of the complex surface based on a section which has an i-th line of intersection, among the number of lines of intersection, as its line of intersection with the predetermined plane, and (3) a third step of specifying a complex curved surface by assembling the section curves based on sections corresponding to respective ones of the lines of intersection.

Thus, data for specifying each of the three-dimensional curved surfaces constituting the complex curved surface are inputted, as well as data specifying one line of intersection on a predetermined plane (e.g. the X-Y plane) as well as a rule for specifying a number of lines of intersection on the X-Y plane on the basis of the line of intersection. It should be noted that the data specifying the three-dimensional curved surfaces are e.g. operating curve data and base curve data. Further, the lines of intersection are straight lines, and the rule decides an (i+1)th line of intersection in such a manner that the intervals between an i-th straight line and the (i+1)th straight line will be constant. As a result, a number of lines of intersection can be specified successively by treating the specified single straight line as the first line of intersection.

Next, there is found a section curve of the complex surface based on a section which has the i-th line of intersection, among the number of lines of intersection, as its line of intersection with the X-Y plane. More specifically, each three-dimensional curve surface is partitioned into a number of patches each comprising a very small quadrilateral by using the inputted data, the coordinates are found of points of intersection between the i-th line of intersection and the four sides of the patch projected onto the X-Y plane, then the coordinates are found of a point on each of the three-dimensional curved surfaces corresponding to each point of intersection. If these steps are followed, section curves of the complex curved surface can be specified by assembling these points.

Thereafter, and in similar fashion, section curves based on sections corresponding to respective ones of the lines of intersection are obtained and the complex curved surface is specified by assembling these section curves.

BRIEF DESCRIPTION OF THE DRAWINGS

FIG. 1(A) is a perspective view of three intersecting curved surfaces;

FIG. 1(B) is a perspective view of the curved surfaces in FIG. 1(A) with an intersecting Y-Z plane; plane;

FIG. 4(A) is a planar view of a first example of lines at the intersection of section planes with the X-Y plane;

FIG. 4(B) is a planar view of a second example of lines at the intersection of section planes with the X-Y plane;

FIG. 4(C) is a planar view of arcs at the intersection of concentric section cylinders and the X-Y plane;

FIG. 5(A) is a perspective view of three-dimensional curved surface creation;

FIG. 5(B) is a planar view of two operating curves transformed onto the same plane;

FIG. 5(C) is a planar view corresponding to FIG. 5(B) with the addition of an intermediate section curve;

FIG. 5(D) is a planar view corresponding to FIG. 5(C) of the intermediate section curve in original and rotated positions;

FIG. 5(E) is a perspective view corresponding to FIG. 5(A) with the rotated intermediate section curve transformed onto a section plane;

DESCRIPTION OF THE PREFERRED EMBODIMENTS

Figure 2:
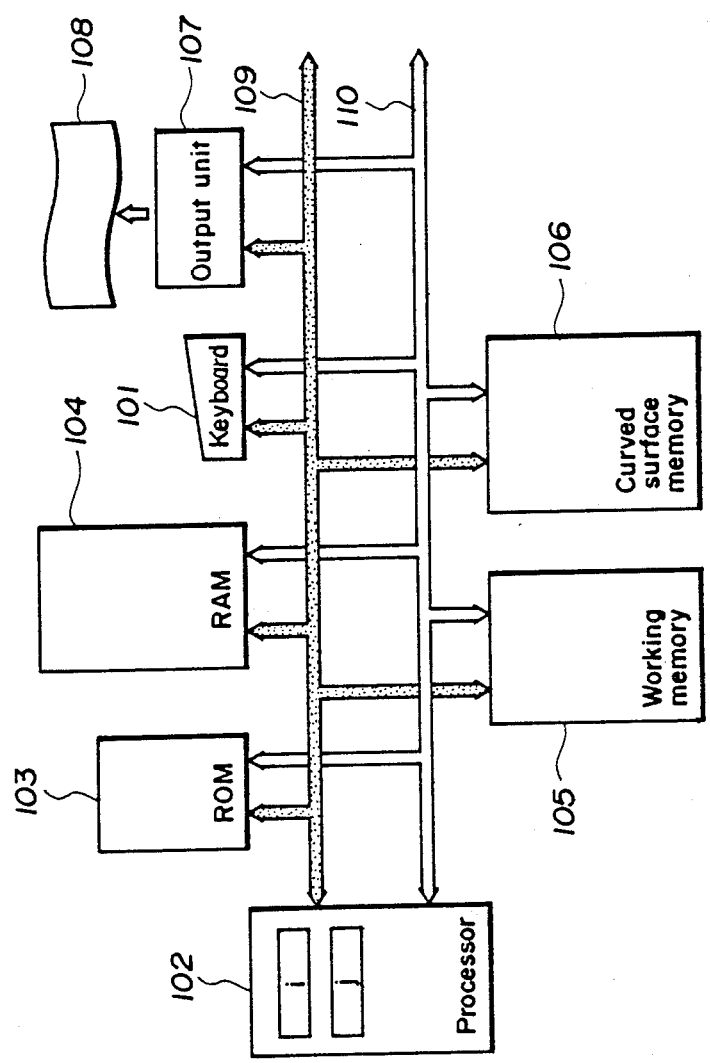
FIG. 2 is a block diagram of an apparatus for realizing the present invention.
Figure 3:
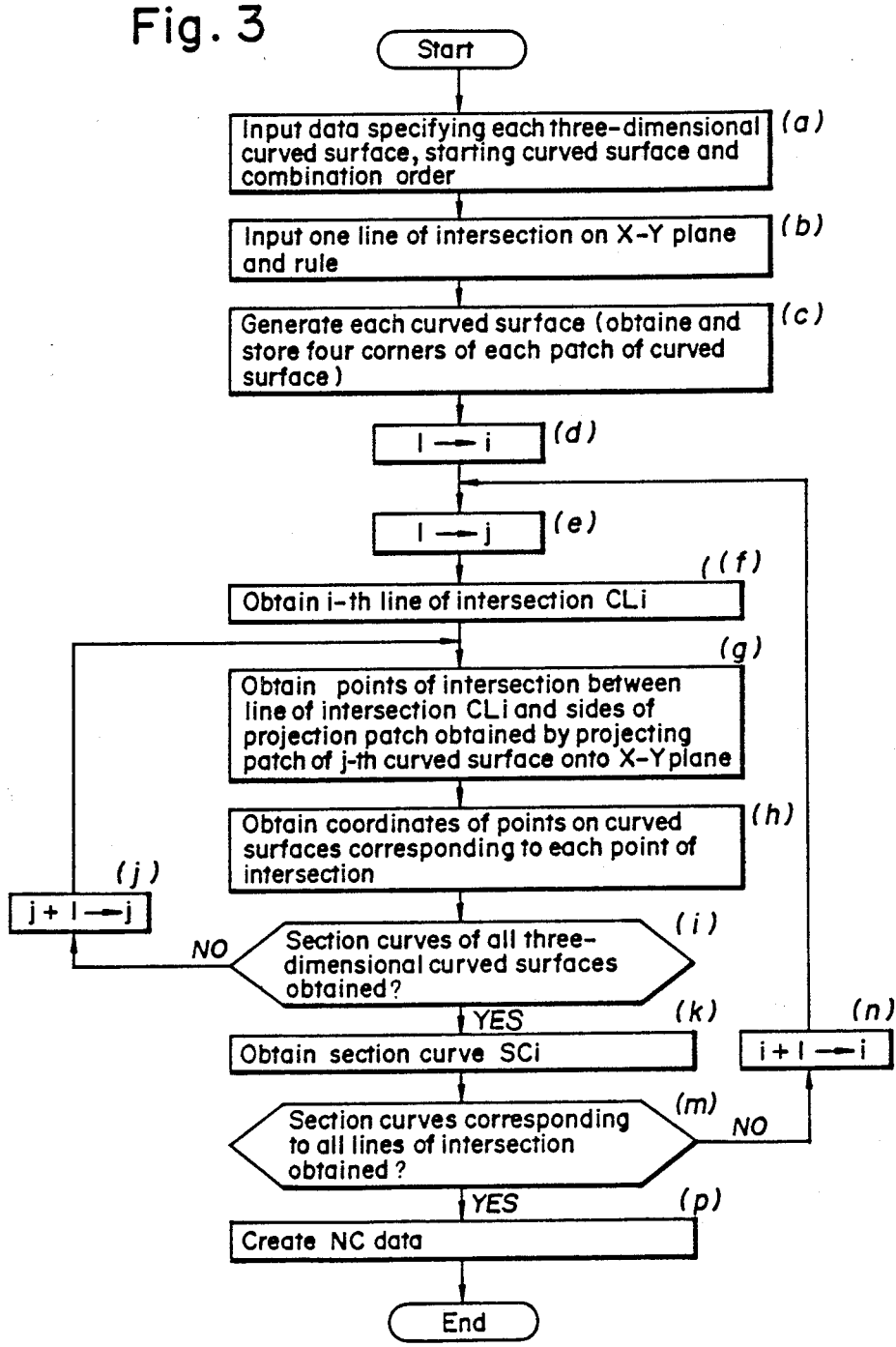
FIG. 3 is a flowchart of complex curved surface creation processing according to the method of the present invention.

FIG. 1 is an explanatory view of the complex curved surface creation method according to the present invention, FIG. 2 is a block diagram showing an embodiment of the inventive method, and FIG. 3 is a flowchart of processing in accordance with the complex curve surface creation method of the present invention. In FIG. 2, numeral 101 denotes a keyboard for data input; 102 a processor; 103 a ROM storing a control program; 104 and RAM; and 105 a working memory.

Numeral 106 designates a curve surface memory for storing curved surface data indicative of a generated complex curved surface, as well as NC program data for curved surface machining; 107 an output unit for outputting curved surface data indicative of a generated complex curved surface, as well as NC program data for curved surface machining, to an external storage medium 108 such as a paper tape or magnetic tape; 109 an address bus; and 110 a data bus.

Processing for creating a complex curved surface in accordance with the present invention will now be described. Note that the step numbers shown below are indicated in the flowchart of FIG. 3.

(a) First, data are entered from the keyboard 101 specifying a first three-dimensional curved surface 201a, a second three-dimensional curved surface 201b, a third three-dimensional curved surface 201c . . . constituting a complex curved surface 201 [see FIG. 1(A)]. In addition, the starting curved surface (assumed to be the first three-dimensional curved surface) is designated as well as the order in which the curved surfaces are combined (the order is assumed here to be the first curved surface, the second curved surface, the third curved surface,..., and so on), this being necessary in generating the complex curved surface. These inputted data are stored in the RAM 104. Each of the three-dimensional curved surfaces 201a–201c is specified by two operating curves DRC1, DRC2 and two base curves BSC1, BSC2, etc. Each of the three-dimensional curved surface is specified by entering these curve data and the like.

(b) Next, data are inputted from the keyboard 101 for specifying a number of sections perpendicular to the X-Y plane, which cuts the complex curved surface 201, and these data are stored in the RAM 104. More specifically, a single line of intersection CLi on the X-Y plane 203 [see FIG. 1(B)] is inputted, as well as a rule for specifying a number of lines of intersection in the X-Y plane on the basis of the single line of intersection.

By way of example, in a case where the sections are parallel to one another and perpendicular to the X-Y plane and, moreover, the spacing between adjacent sections is constant, the line of intersection CLi (i=1, 2, 3, . . . ) between each section and the X-Y plane is as shown in FIG. 4(A). In such case, therefore, data specifying the first line of intersection CL1, as well as the distance between two adjacent lines of intersection (either the distance along the X axis or the distance along the Y axis will suffice), are inputted.

In a case where the sections intersect one another in a straight line perpendicular to the X-Y plane and, moreover, the angles between adjacent sections are constant, lines of intersection CLi (i=1, 2, 3, . . . ) between the sections and the X-Y plane intersect successively at equal angles at a single point P, as shown in FIG. 4(B). In such case, therefore, data are inputted specifying the first line of intersection CL1 and the point P, and a angle $\alpha$ defined by two mutually adjacent lines of intersection is also inputted.

Further, in a case where the sections are mutually concentric cylinders perpendicular to the X-Y plane and, moreover, the spacing between adjacent cylinders is constant, the lines of intersection CLi (i=1, 2, 3, . . . ) between the sections and the X-Y plane are concentric cylindrical arcs, as shown in FIG. 4(C). In such case, therefore, data are inputted specifying the first line of intersection CL1, and the distance d between two mutually adjacent lines of intersection is also inputted. If the lines of intersection shown in FIG. 4(A) and the rule are inputted, the three-dimensional curved surfaces 201a–201c are cut by a predetermined plane 202 [see FIG. 1(B)] specified by one of the lines of intersection and the rule. The section curves that result are SC1i, SC2i, SC3i, . . . and so on.

(c) When these data have been entered, the processor 102 generates each of the three-dimensional curved surfaces 201a–201c by a well-known method. FIG. 5 is a view for describing such curved surface generation processing. In FIG. 5(A), numerals 301, 302 denote sections (given sections) of the three-dimensional curved surface 201a; DRC1, DRC2 denote section curves (operating curves) for a case where the three-dimensional curved surface 201a is cut by the given sections 301, 302; numeral 303 designates a first base plane which includes first points P1, P1' on the operating curves DRC1, DRC2, respectively; numeral 304 designates a second base base plane which includes second points P2, P2' on the operating curves DRC1, DRC2, respectively; BSC1, BSC2 represent first and second base curves lying in the first and second base planes 303, 304, respectively, and specifying the external form of the three-dimensional curved surface 201a; and numeral 305 designates an intermediate section which includes points P1", P2" that internally divide the first and second base curves BSC1, BSC2 into the ratio m:n, respectively, and which also includes a point of intersection P3" between the first base plane 303 and a normal line dropped onto the first base plane 303 from the dividing point P2". The curved surface 201a is generated by the following steps (1) through (6):

(1) Section information (dividing ratio m:n) relating to the intermediate section 305 is found. In other words, the intermediate section is generated which includes the dividing points P1", P2" that internally divide the base curves BSC1, BSC2 into the ratio m:n, respectively.

(2) Next, the operating curves DRC1, DRC2 and the points of intersection P1", P2" are transformed onto the same plane [FIG. 5(B)]. It should be noted that the operating curves DRC1, DRC2 and points of intersection P1", P2" can be considered to be curves and points on the same plane by performing the following operations (2-1) through (2-3).

(2-1) The points of intersection P1, P1' and the point of intersection P1" between the base curve BRC1 and both given sections 301, 302 are made the same point.

(2-2) Considering lines of intersection HL, HL', HL" between the base plane 303 and the sections 301, 302 and intermediate section 305, respectively, these lines of intersection HL, HL', HL" are divided by the respective points of intersection P1, P1', P1". These divided segments are superposed.

(2-3) Considering that straight lines VL, VL', VL" which pass through the points of intersection P1, P1', P1" and are perpendicular to the base curve BSC1 lie on the given sections 301, 302 and intermediate section 305, respectively, it is seen that the lines of intersection VL, VL', VL" are divided by the points of intersection P1, P1', P1" respectively. Of these divided segments, those that have the same direction with respect to the base curve BSC1 are superposed.

(3) By using the operating curves DRC1', DCR2' [see FIG. 5(B)] lying in the predetermined plane obtained from step (2) above, an intermediate section curve 305a is generated in said plane [FIG. 5(C)].

The intermediate section curve 305a is generated through the following procedure:

(3-1) Points A1, A2, which divide the lengths of the respective operating curves DRC1', DRC2' each into a ratio of a:b, are found through the following procedure:

(3-1a) The lengths of the elements constituting the respective operating curves DRC1', DRC2' are found (where the term "element" is taken to mean a line segment or an arc constituting the respective operating curve), and these lengths are added together to find the total length D of each of the operating curves DRC1', DRC2'.

(3-1b) D' is evaluated from $D' = D \cdot a/(a+b)$ (3-1c) An element is extracted containing a point at a distance D' from one end of the segment, which point serves as a reference point for division. If D1 is taken as the length of the initial element, D2 as the length of the next element, Di as the length of the i-th element and so on, the extraction of elements is carried out by finding the k that satisfies the following inequality:

$$\sum_{i=1}^{k-1} Di \leq D' \leq \sum_{i=1}^{k} Di$$

(3-1d) This step is to find the point on the k-th element whose distance from the starting point thereof is D", where D" is found from:

$$D'' = D' - \sum_{i=1}^{k-1} Di$$

The points obtained are those that divide the operating curves DRC1', DRC2' into the ratio a:b from the one ends P1, P1' thereof. In step (3-1c), when k=1, it shall be assumed that $$\sum_{i=1}^{k-1} Di = 0$$

(3-2) A dividing point Bi is computed, which point divides a straight line connecting the dividing points A1, A2 into a ratio of m:n of step (1). [See FIG. 5(C)]

If the coordinates of the dividing points A1, A2 are denoted by (x1,y1) and (x2,y2), respectively, then the coordinates (X,Y) of the dividing point Bi are calculated from:

$$X = x1 + (x2 - x1) \cdot m/(m+n)$$

$$Y = y1 + (y2 - y1) \cdot m/(m+n)$$

(3-3) The intermediate section curve 305a is generated by a series of points Bi (i=1,2,3 ...) obtained by changing the value of the dividing ratio a:b of step (3-1) gradually from 0 to 1 [dashed line in FIG. 5(C)].

(4) The intermediate section curve 305a on the predetermined plane found in step (3) and the points of intersection P1", P2" are used to generate an intermediate section curve 305a' on the predetermined plane [see FIG. 5(D)]. The intermediate section curve 305a' is generated through the following procedure:

(4-1) A ratio k/l of the length k of a line segment connecting the starting point P1" and end point Pe of the intermediate section curve 305a to the length l of a line segment connecting the points of intersection P1", P2", and an angle of rotation θ for rotating the line segment P1"Pe clockwise through an angle PeP1"P2" to bring it into coincidence with P1"P2", are calculated [FIG. 5(D)].

(4-2) A dividing point Ci that divides the intermediate section curve 305a into a ratio of a:b is obtained through a method the same as that of steps (3-1a)–(3-1d).

(4-3) A computation is performed to obtain a point Ci" which results when an external dividing point Ci', for externally dividing the line segment P1Ci into a ratio of k:l, is rotated by the angle θ [FIG. 5(D)].

Letting (xi, yi) represent the coordinates of the dividing point that divides the intermediate section curve 305a into the ratio of a:b, letting (xo, yo) represent the coordinates of Pi", and letting (X, Y) represent the coordinates of C1", the coordinates of Ci" are found from:

$$X = xo + [l(xi - xo) \cdot \cos \theta/k] - [l(yi - yo) \cdot \sin \theta/k]$$

$$Y = yo + [l(xi - xo) \cdot \sin \theta/k] - [l(yi - yo) \cdot \cos \theta/k]$$

(4-4) The intermediate section curve 305a' is generated by a series of points Ci" (i=1, 2, 3, ...) by changing the value of the dividing ratio of step (4-2) gradually from 0 to 1 [the dashed line in FIG. 5(D)].

(5) If the intermediate section curve 305a' on the predetermined plane obtained in step (4) is transformed into an intermediate curve lying on the intermediate section 305 [FIG. 5(E)] within the defined space, then an intermediate section curve 305a will be generated based on the intermediate section 305 containing the dividing points P1", P2" that divide the respective base curves BSC1, BSC2 into the ratio of m:n.

(6) The three-dimensional curved surface 201a is generated if the steps (2)–(5) are executed while changing the dividing ratio m/n in step (1) gradually from 0 to 1.

Figure 6:
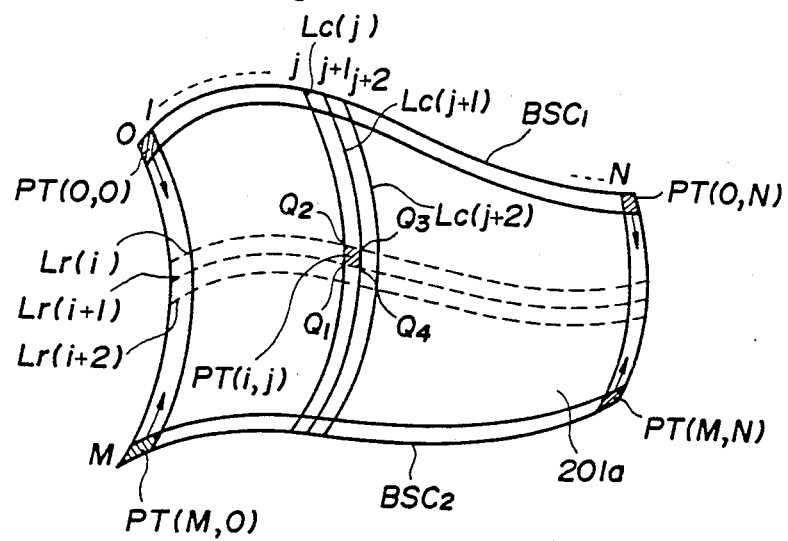
FIG. 6 is an explanatory view of a patch.

As shown in FIG. 6, let Lc(j) express an intermediate section curve containing a j-th dividing point on the base curve BSCl, and let Lr(i) express a curve obtained by connecting an i-th dividing point on each of the intermediate section curves Lc(j) (j=1, 2, 3, ... n). A quadrilateral bounded by curves Lc(j), Lc(j+1), Lr(i) and Lr(i+1) shall be referred to as a "patch" PT (i, j). The four vertices Q1, Q2, Q3, Q4 of the patch PT (i, j) are generated by the above-described curved surface creation processing and are stored in the curve surface memory 106.

When the processing for generating the curved surface 201a in accordance with step (c) is completed, processing for creating a complex curved surface begins, as follows:

(d) First, the operation 1→i is performed.

(e) Next, the operation 1 →k is performed.

(f) The processor 102 then obtains a line of intersection CLi on the i-th X-Y plane by using the data indicative of the 1st line of intersection and the spacing between the lines of intersection obtained in step (b).

(g) When the i-th line of intersection CLi has been found, the processor 102 finds the points of intersection between the i-th line of intersection CLi and the sides of projection patches, which are obtained by projecting each patch of the j-th three-dimensional curved surface onto the X-Y plane.

(h) When the coordinates of all points of intersection between the sides of several projection patches and the i-th line of intersection CLi have been obtained, the coordinates of points on the j-th three-dimensional curved surface corresponding to these points of intersection are computed. Specifically, the coordinates of the points on the j-th curved surface, which points are obtained by projecting the points of intersection onto the X-Y plane, are found.

Figure 7:
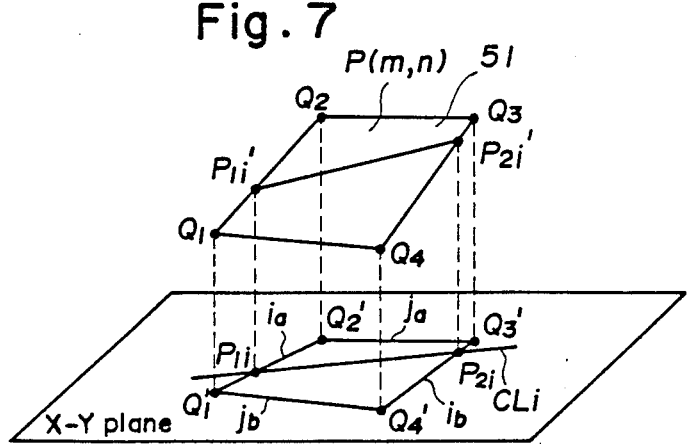
FIG. 7 is a view for describing the calculation of coordinates of a point on a curved surface.

FIG. 7 is a view for describing a method of computing the coordinates of the points on the curved surface. Four sides ia, ib, ja, jb are obtained by projecting a predetermined patch P (m, n) on a three-dimensional curved surface onto the X-Y plane. Let P1i, P2i represent the points of intersection between the i-th line of intersection CLi and a predetermined two of these four sides, and let (x1i, y1i), (x2i, y2i) represent the coordinates of these points of intersection. Further, let Q1', Q2' denote the end points of the side ia intersected by the line of intersection CLi, let Q3', Q4' denote the end points of the side ib intersected by the line of intersection CLi, let Qi (i=1-4) represent the points on the three-dimensional curved surface that correspond to the points Qi' (i=1-4), and let (xi, yi, zi) denote the coordinates of each of the points Qi. Then, the Z coordinates z1i, z2i of the points P1i', P2i' on the curved surface that correspond to the points of intersection P1i, P2i are calculated in accordance with the following equations:

$$z1i = z1 + (z2 - z1)(x1i - x1)/(x2 - x1)$$

$$z2i = z3 + (z4 - z3)(x2i - x3)/(x4 - x3)$$

The coordinates of the points on the curved surface will be (x1i, y1i, z1i), (x2i, y2i, z2i).

The coordinates of points on the j-th three-dimensional curved surface that correspond to all of the points of intersection are found through the foregoing procedure and these coordinates are stored in the curve surface memory 106. This will provide a section curve SCji obtained when the j-th three-dimensional curved surface is cut by a section corresponding to the i-th line of intersection CL.

(i) Next, the processor 102 checks whether the section curves for all three-dimensional curved surfaces have been obtained.

(j) If the section curves [S1i, S2i, S3i, . . . in FIGS. 1(B), (C)] of all three-dimensional curved surfaces have not been obtained, the operation j+1→j is performed and the processing from step (g) onward is repeated.

(k) If the section curves (S1i, S2i, S3i, . . . ) of all three-dimensional curved surfaces have been obtained, on the other hand, the section curve SCi [see the dashed line in FIG. 1(C)] of the complex curved surface 201 is found through the following processing: Specifically, a point of intersection between the section curve Sji and a section curve S(j+1)i (j=1, 2, 3, . . . ) is calculated. When a point of intersection Rji (j=1, 2, . . .) has been found as set forth above, a section curve SCi corresponding to the i-th line of intersection CLi is specified by a section curve S1i between points of intersection Roi, R1i, a section curve S2i between points of intersection R1i, R2i, a section curve S3i between points of intersection R2i, R3i, . . . and so on.

(m) When the section curve SCi has been found, it is checked whether section curves corresponding to all lines of intersection CLi have been obtained.

(n) If section curves corresponding to all lines of intersection have not been obtained, the operation i+1→i is performed and processing from step (e) onward is repeated.

(p) If section curves corresponding to all lines of intersection have been obtained, however, the processing for creating the complex curved surface ends. Accordingly, as the occasion demands, the processor 102 subsequently causes the output unit 107 to output the complex curved surface data to the external storage medium 108, or uses the complex curved surface data to create an NC program for complex curved surface machining, which program is then stored in memory 106 or outputted to the external storage medium 108.

Though the foregoing relates to a case in which offset processing is executed, it is also possible to obtain offset curved surfaces by offsetting each of the three-dimensional curved surfaces in a direction normal to the curved surface by an amount based on the tool type (bore-end milling tool, flat-end milling tool, forming tool) and tool diameter, then obtain a complex curved surface by combining these offset curved surfaces. In a case where an offset complex curved surface is created, it is possible to perform a tool interference check. Further, according to the present invention, a complex curved surface can be created in such a manner that a fillet surface (a surface to which the character R is assigned) is provided at the boundary portions of each of the three-dimensional curved surfaces if required.

According to the present invention, the arrangement is such that a complex curved surface is specified by inputting data for specifying each of three-dimensional curved surfaces and inputting data specifying one line of intersection on a predetermined plane as well as a rule for specifying a number of lines of intersection on the predetermined plane on the basis of said line of intersection, finding a section curve of the complex surface based on a section which has an i-th line of intersection, among the number of lines of intersection, as its line of intersection with the predetermined plane, and assembling the section curves based on sections corresponding to respective ones of the lines of intersection. This enables a complex curved surface having a complicated form to be accurately created. Accordingly, the invention is well-suited for application to an apparatus which prepares NC tapes for molds or the like having a complicated shape.

What is claimed is:

1. A complex curved surface creation method for creating a complex curved surface composed of at least two three-dimensional curved surfaces, comprising the following steps:
   (a) inputting data for specifying each of said three-dimensional curved surfaces, and inputting data specifying a single specified line of intersection on a reference plane and inputting a rule for determining additional lines of intersection of section planes with said reference plane on the basis of said single specified line of intersection;
   (b) finding a plurality of section curves of the complex curved surface, each of said section curves lying in an i-th section plane having an i-th line of intersection, among said additional lines of intersection, with said reference plane, including the steps of:
   (bi) dividing each of said three-dimensional curved surfaces into a plurality of patches each comprising a quadrilateral by using the inputted data;
   (bii) obtaining coordinates of points of intersection between an i-th line of intersection and the sides of the patches projected onto said reference plane;
   (biii) obtaining coordinates of points, each point lying on one of the three-dimensional curved surfaces and corresponding to one of the points of intersection; and
   (biv) obtaining section curves by assembling said points on the three-dimensional curved surfaces; and
   (c) machining a complex curved surface using an assemblage of the section curves lying in said section planes forming respective ones of the single specified and additional lines of intersection with said reference plane.

2. A complex curved surface creation method according to claim 1, wherein step (biii) comprises calculating the coordinates of each of the points on the three-dimensional curved surfaces corresponding to said points of intersection using a proportional distribution between coordinates of surface end points on the three-dimensional curved surfaces corresponding to projected end points of each of the four sides of the patch projected onto said reference plane, intersecting said i-th line of intersection and the coordinates of said points of intersection in said reference plane.

3. A complex curved surface creation method according to claim 2, wherein each of said section planes is perpendicular to said reference plane.

4. A complex curved surface creation method according to claim 2,
   wherein each of said additional lines of intersection is a straight line, and
   wherein step (a) comprises inputting said rule for determining an (i+1)th line of intersection to provide constant spacing between each i-th line of intersection and the (i+1)th line of intersection, said additional lines of intersection being determined in regular order with said single specified line of intersection serving as a first straight line.

5. A complex curved surface creation method according to claim 2,
   wherein each of said additional lines of intersection is a straight line, and
   wherein step (a) comprises inputting said rule for determining an (i+1)th line of intersection to form a constant angle between each additional line of intersection and an adjacent line of intersection, said additional lines of intersection being determined in regular order with said single specified line of intersection serving as a first straight line.

6. A complex curved surface creation method according to claim 2,
   wherein each of said additional lines of intersection is a circular arc, and
   wherein step (a) comprises inputting said rule for determining each circular arc to provide constant spacing between concentric i-th and (i+1)th circular arcs, said additional lines of intersection being determined in regular order with said single specified line of intersection serving as a first circular arc.

* * * * *